United States Patent
Clarke et al.

(10) Patent No.: US 9,104,227 B2
(45) Date of Patent: Aug. 11, 2015

(54) STEERING APPARATUS FOR A STEERED VEHICLE

(71) Applicant: MARINE CANADA ACQUISITION, INC., Richmond, British Columbia (CA)

(72) Inventors: Douglas Clarke, Bradenton, FL (US); Anson Chan, Richmond (CA); David Higgs, Vancouver (CA)

(73) Assignee: MARINE CANADA ACQUISITION, INC. (CA)

( * ) Notice: Subject to any disclaimer, the term of this patent is extended or adjusted under 35 U.S.C. 154(b) by 0 days.

(21) Appl. No.: 14/563,035

(22) Filed: Dec. 8, 2014

(65) Prior Publication Data
US 2015/0192947 A1    Jul. 9, 2015

Related U.S. Application Data

(62) Division of application No. 13/878,859, filed as application No. PCT/US2013/026142 on Feb. 14, 2013.

(60) Provisional application No. 61/598,701, filed on Feb. 14, 2012.

(51) Int. Cl.
*B63H 25/02* (2006.01)
*G05G 1/08* (2006.01)
*G05G 5/04* (2006.01)
*B62D 5/00* (2006.01)
*B63H 25/24* (2006.01)

(52) U.S. Cl.
CPC ............. *G05G 1/082* (2013.01); *B62D 5/001* (2013.01); *B63H 25/24* (2013.01); *G05G 5/04* (2013.01)

(58) Field of Classification Search
USPC ............. 701/21; 114/144 R, 144 RE; 440/64; 192/89.2, 70.2, 84.7, 90
See application file for complete search history.

(56) References Cited

U.S. PATENT DOCUMENTS

| | | | |
|---|---|---|---|
| 7,258,072 B2 * | 8/2007 | Wong et al. .................... | 114/146 |
| 2005/0042532 A1 * | 2/2005 | Iida et al. ......................... | 430/45 |
| 2005/0229834 A1 * | 10/2005 | Wong et al. ............. | 114/144 RE |
| 2011/0195816 A1 * | 8/2011 | Martin et al. .................. | 477/115 |

* cited by examiner

Primary Examiner — Ruth Ilan
(74) Attorney, Agent, or Firm — Steven B. Kelber (57) ABSTRACT

A steering apparatus comprises a rotatable steering shaft and a sensor which senses angular movement of the steering shaft. An electromagnetic actuator actuates a stop mechanism to releasable engage the steering shaft. There is a microcontroller which causes the electromagnetic actuator to actuate the stop mechanism to fully engage the steering shaft and prevent rotation of the steering shaft in a first rotational direction, which corresponds to movement towards the hardstop position, while allowing rotational play between the steering shaft and the stop mechanism in a second direction, which corresponds to rotational movement away from the hardstop position, when the sensor senses that the steering shaft has reached a hardstop position. A driver applies a reserve polarity pulse to the electromagnetic actuator when the stop mechanism is fully engaged and the steering shaft is rotated, as permitted by the rotational play, in the second rotational direction.

15 Claims, 7 Drawing Sheets

STEERING APPARATUS FOR A STEERED VEHICLE

CROSS-REFERENCE TO RELATED APPLICATION

This application is a Divisional Application of U.S. patent application Ser. No. 13/878,859, filed Apr. 11, 2013, pending, which is a National Stage of PCT/US13/26142, filed Mar. 14, 2012, pending, which claims the benefit under 35 U.S.C. §119(e) of U.S. Provisional Patent Application No. 61/598,701, filed Feb. 14, 2012, which is incorporated by reference herein in its entirety.

BACKGROUND OF THE INVENTION

1. Field of the Invention

The present invention relates to a steering apparatus and, in particular, to a steering apparatus for a steered vehicle.

2. Description of the Related Art

U.S. Pat. No. 7,137,347 which issued on Nov. 21, 2006 to Wong et al. discloses helm apparatus for a marine vessel or other vehicle having a steered member such as a rudder. The helm apparatus includes a mechanically rotatable steering device and a sensor which senses angular movement of the steering device when the marine vessel is steered. A communication link to the rudder enables the helm apparatus to monitor the rudder position. A bi-directional stop mechanism is actuated when the helm apparatus determines that the rudder position is beyond starboard or port hard-over thresholds, indicating that the rudder has reached a limit of travel. The helm apparatus can cause the stop mechanism to fully engage the steering device to stop further rotation of the steering device in a first rotational direction, corresponding to rotational movement towards the limit of travel.

SUMMARY OF THE INVENTION

It is an object of the present invention to provide an improved steering apparatus for a steered vehicle. The steered vehicle may be a land vehicle or a marine vehicle.

There is accordingly provided a steering apparatus for a steered vehicle. The steering apparatus comprises a rotatable steering shaft and a sensor which senses angular movement of the steering shaft as the vehicle is being steered. An electromagnetic actuator actuates a stop mechanism to releasably engage the steering shaft. There is a microcontroller which processes a steering sensor signal and causes the electromagnetic actuator to actuate the stop mechanism to fully engage the steering shaft when the sensor senses that the steering shaft has reached a hardstop position to prevent rotation of the steering shaft in a first rotational direction, which corresponds to movement towards the hardstop position, while allowing rotational play between the steering shaft and the stop mechanism in a second direction, which corresponds to rotational movement away from the hardstop position. A driver applies a reserve polarity pulse to the electromagnetic actuator when the stop mechanism is fully engaged with the steering shaft and the steering shaft is rotated, as permitted by the rotational play, in the second rotational direction.

The driver may apply there serve polarity pulse at a moment when the steering shaft is rotated, as permitted by the rotational play, in the second rotational direction. The microcontroller may cause the electromagnetic actuator to actuate the stop mechanism to release the steering shaft when the stop mechanism is fully engaged with the steering shaft and the steering shaft is rotated, as permitted by the rotational play, in the second rotational direction. The microcontroller may cause the electromagnetic actuator to actuate the stop mechanism to partially engage the steering shaft to provide steering resistance.

The stop mechanism may include a multi-plate clutch having a plurality of clutch plates which are urged into frictional engagement with each other by the electromagnetic actuator to engage the steering shaft. There may be a housing with a hollow interior and there may be grooves on an interior wall of the housing. A first type of clutch plates may have projections which fit within the grooves on the interior wall of the housing. There may be inserts in the grooves on the interior wall of the housing. There may be grooves on the steering shaft wherein a second type of clutch plates have projections which fit within the grooves in the steering shaft. The grooves on the steering shaft may be wider than the projections on the second type of clutch plates to allow for the rotational play between the steering shaft and the stop mechanism when the stop mechanism is fully engaged. There may be inserts in the grooves on the steering shaft.

The electromagnetic actuator may include an electromagnetic coil mounted on a mounting plate and an armature. The clutch plates may be disposed between the mounting plate and the armature. There may be a spring which preloads the clutch plates for improved gap control. There may be a shim between the electromagnetic coil and the mounting plate to set the electromagnetic coil and the mounting plate at a predetermined clearance. The steered vehicle may be a land vehicle or a marine vehicle.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
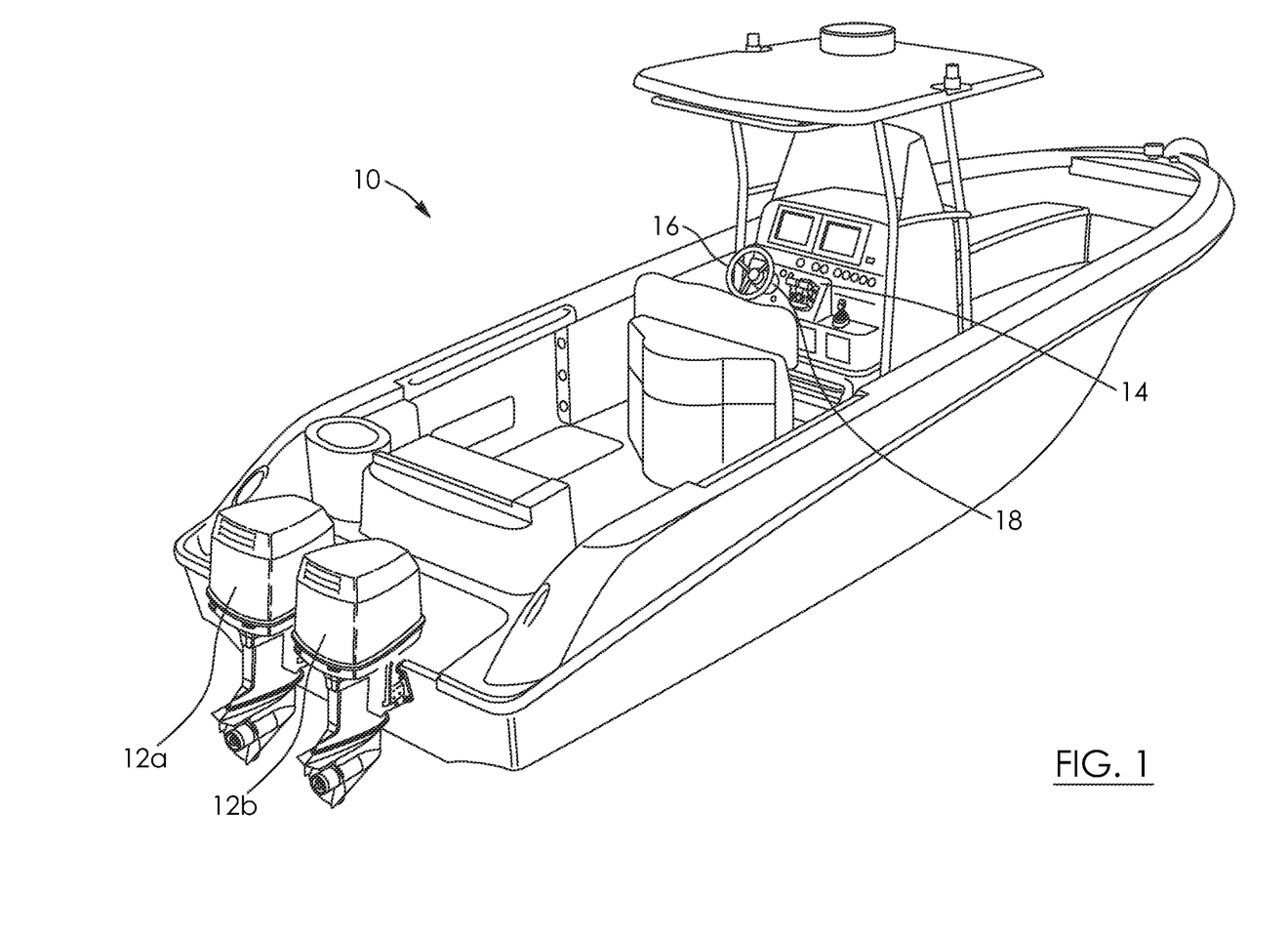
FIG. 1 is a perspective view of a marine vehicle provided with an improved steering apparatus.

Referring to the drawings and first to FIG. 1, this shows a vehicle in the form of a marine vessel 10 which is provided with propulsion units in the form of outboard engines 12a and 12b. In this example there are two engines, namely, a port engine 12a and a starboard engine 12b. However, in other examples, the marine vessel may be provided with any suitable number of engines. It is common to have one engine or as many as five engines in pleasure marine vessels. The marine vessel 10 is also provided with a control station 14 that supports a steering wheel 16 mounted on a helm or steering apparatus 18. The steering wheel 16 is conventional and the steering apparatus 18 is shown in greater detail in FIG. 2.

The steering apparatus 18 is improved over the helm disclosed in U.S. Pat. No. 7,137,347 which issued on Nov. 21, 2006 to Wong et al. and the full disclosure of which is incorporated herein by reference. The steering apparatus 18 includes a housing 20 which is shown partially broken away in FIG. 2. There is a plurality of circumferentially spaced-apart axially extending grooves, for example groove 22, on an inner wall 24 the housing 20. There is also a plurality of resilient, channel-shaped inserts, for example insert 26, each of which is received by a corresponding one of the grooves on the inner wall of the housing. A steering shaft 28 extends through the housing 20. The steering wheel 16, shown in FIG. 1, is mounted on the steering shaft 28. The steering shaft 28 includes a hollow drum portion 30 which has a cylindrical outer wall 32. There is a plurality of circumferentially spaced-apart grooves, for example groove 34, extending axially on the cylindrical outer wall 32 of the hollow drum 30. There is also a plurality of resilient, channel-shaped inserts, for example insert 36, each of which is received by a corresponding one of the grooves on the cylindrical outer wall of the hollow drum.

Figure 2:
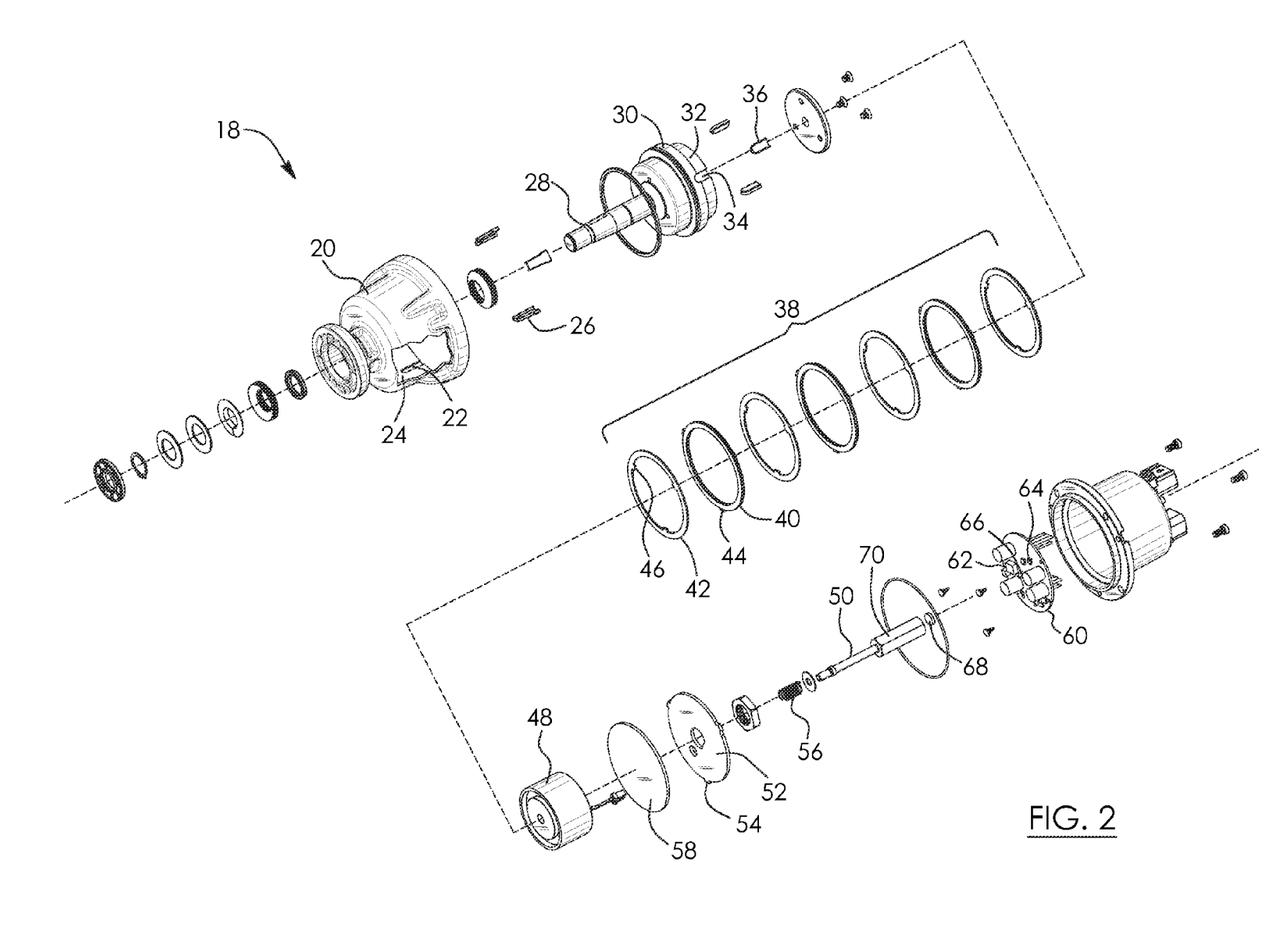
FIG. 2 is an exploded view of the steering apparatus of FIG. 1.

The steering apparatus 18 further includes a multi-plate clutch 38. There are two types of interposed substantially annular clutch plates in the multi-plate clutch 38. Clutch plate 40 is an exemplar of a first type of the clutch plate and clutch plate 42 is exemplar of a second type of clutch plate. The first type of clutch plate each have exterior projections, for example spline 44 shown for clutch plate 40, which are positioned to engage the grooves 22 on the inner wall 24 of the housing 20. The clutch plates 40 are thus axially slidable but non-rotational within the housing 20. The inserts 26 in the grooves 22 on the inner wall 24 of the housing 20 may provide dampened motion and additional position control. The second type of clutch plate each have interior projections, for example spline 46 as shown for clutch plate 42, that are positioned to engage the grooves 34 on the cylindrical outer wall 32 of the hollow drum 30 of the steering shaft 28. The clutch plates 42 are thus axially slidable with respect to the steering shaft 28. A limited amount of rotational movement is also permitted between the clutch plates 42 and the steering shaft 28 because the grooves 34 on the steering shaft 28 are wider than the splines 46 on the clutch plates 42. The inserts 36 in the grooves 34 may provide dampened motion and additional position control.

The steering apparatus 18 further includes an actuator in the form of an electromagnetic actuator which, in this example, includes an electromagnetic coil 48 and an armature 50. The electromagnetic coil 48 is mounted on a circular mounting plate 52. The circular mounting plate has exterior projections, for example spline 54, which are positioned to engage the grooves 22 on the inner wall of the housing 20 such that the mounting plate 52 is axially slidable but non-rotational within the housing 20. The armature 50 is coupled to the steering shaft 28. When the electromagnetic coil 48 is energized, the electromagnetic coil 48 and the mounting plate 52 are drawn along the armature 50 to force the clutch plates 40 and 42 together. Since the first type of clutch plates 40 are non-rotatable with respect to the housing 20 and the second type of clutch plates 42 are non-rotatable with respect to the steering shaft 28, apart from the rotational play discussed above, friction between the clutch plates 40 and 42, when the electromagnetic coil 48 is energized, causes the stop mechanism to brake the steering apparatus 18, i.e. stop rotation of the steering shaft 28 relative to the housing 20.

There is a spring 56 which preloads the clutch plates 40 and 42 for improved gap control between the clutch plates 40 and 42. The spring 56 performs two functions, namely, counter-acting gravitational forces which may pull the clutch plates 40 and 42 apart and providing passive background steering resistance by partially forcing the clutch plates 40 and 42 together. The steering apparatus 18 may also be provided with a shim 58 between the electromagnetic coil 48 and the mounting plate 52. The shim 58 is a liquid shim in this example. The shim 58 sets the electromagnetic coil 48 and the mounting plate 52 apart by a predetermined clearance and which allows for consistency in the attractive force of the magnetic field.

The steering apparatus 18 further includes a circuit board 60 upon which is mounted a microcontroller 62, an H-bridge driver 64, and a rotational sensor 66. The microcontroller 62 controls current supplied to the electromagnetic coil 48 to provide dynamic steering resistance. The H-bridge driver 64 is responsible for energizing or applying current to the electromagnetic coil 48 to both vary steering resistance and brake the steering apparatus 18. The H-bridge driver 64 may also apply a reverse polarity pulse to the electromagnetic coil 48 when the steering shaft is rotated away from a hardstop. The rotational sensor 66 detects rotation of the steering shaft 28. In this example, a magnet 68 is disposed on an end of a shaft 70 of the armature 50 which rotates with the steering shaft 28. The rotational sensor 66 detects rotation of the magnet 68 and, accordingly, rotation of the steering shaft 28 and steering wheel 16.

Dynamic steering resistance is accomplished through pulse width modulation (PWM) of current supplied to the electromagnetic coil 48. The electromagnetic coil 48 may thereby only be partially energized, resulting in some friction between the clutch plates 40 and 42 but not sufficient to friction to stop the steering shaft 28 from rotating. The amount of steering resistance can be adjusted by the microcontroller 62 for different circumstances. For example, when the steering wheel 16 and steering shaft 28 are rotated too fast or the outboard engines 12a and 12b are heavily loaded. The outboard engines may be prevented from keeping up with the steering apparatus 18. The steering resistance can then be made greater to provide feedback to the operator, slowing down the rate of rotation of the steering wheel 16 and steering shaft 28. The steering resistance can also be made greater at higher boat speeds and lower at low boat speeds as encountered during docking. Greater steering resistance can also be used to indicate that the battery charge is low to discourage fast or unnecessary movements of the steering apparatus. Steering resistance can also be made greater to provide a proactive safety feature for non-safety critical failures. By imposing a slight discomfort to the operator, this intuitive sensation feedback alerts the operator that the steering system behaves in a reduced performance steering mode, encouraging the operator to slow down the boat or return to dock. It will be appreciated that the spring 56 also provides steering resistance and, accordingly, there may be steering resistance even when the electromagnetic coil 48 is not energized. This allows for power conservation while still having steering resistance.

Figure 3:
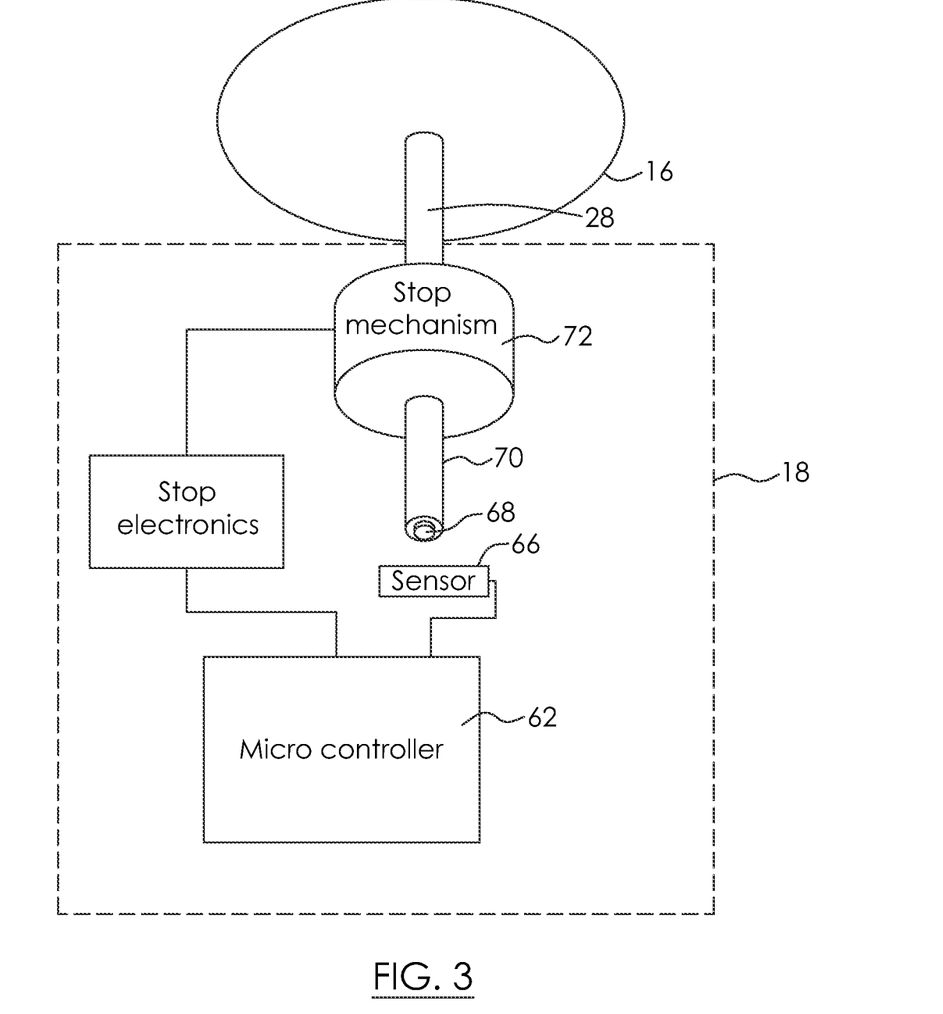
FIG. 3 is a diagrammatic view of the steering apparatus of FIG. 1.

The microcontroller 62 also drives the H-Bridge driver 64 to energize the electromagnetic coil 48 to actuate a stop mechanism 72, shown in FIG. 3, to brake the steering apparatus 18, i.e. to stop rotation of the steering shaft 28. Braking occurs when the rotational sensor 66 senses that the steering shaft has reached a hardstop position based on a steering angle. The stop mechanism 72 is generally comprised of the multi-plate clutch 38, shown in FIG. 2, the plates of which are urged into frictional engagement with one another by the electromagnetic actuator to restrict rotation of the steering shaft 28. In particular, the stop mechanism 72 is actuated to fully engage the steering shaft 28 to prevent rotation of the steering shaft 28 in a first rotational direction, which corresponds to movement towards the hardstop position, while allowing rotational play between the steering shaft 28 and the stop mechanism 72 in a second direction, which corresponds to rotational to rotational movement away from the hardstop position, when the sensor senses the steering shaft has reached a hardstop position.

Figure 4A:
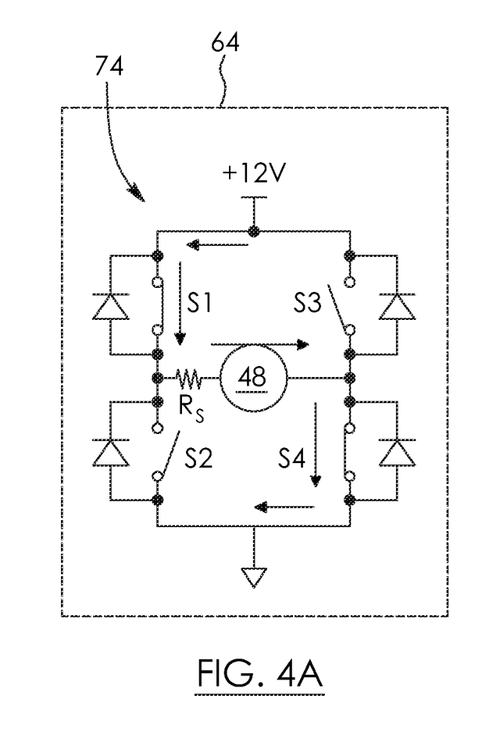
FIGS. 4A to 4C are schematics of switches integrated into the H-driver bridge of the steering apparatus of FIG. 1.
Figures 4B, 4C:
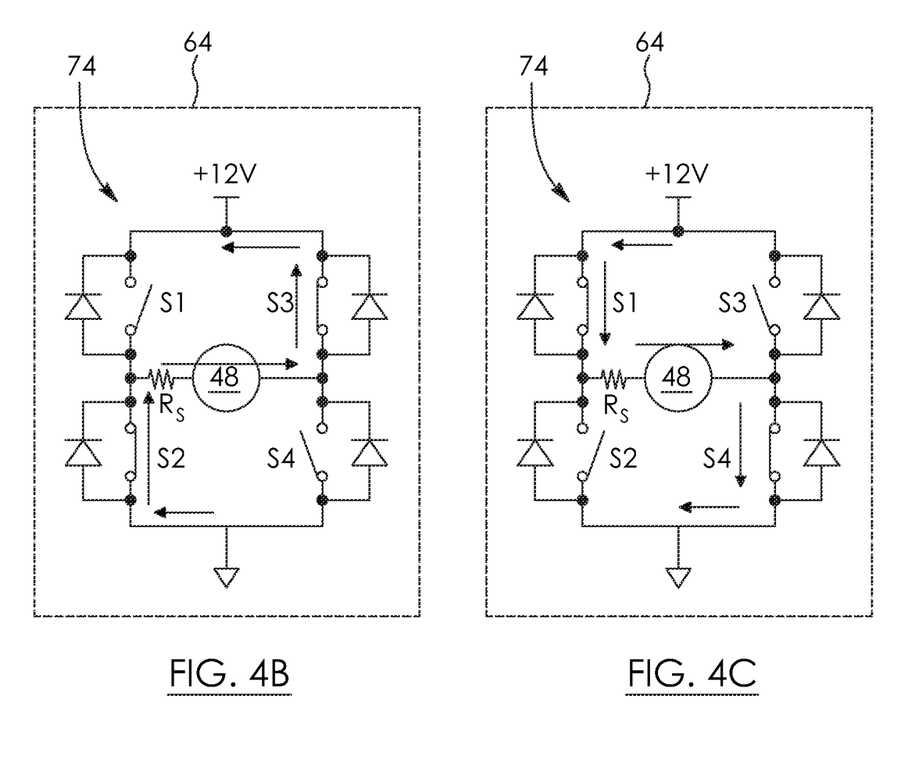

The H-bridge driver 64 applies a reserve polarity pulse to the electromagnetic actuator when the stop mechanism 72 is fully engaged with the steering shaft 28 and the steering shaft is rotated, as permitted by the rotational play, in the second rotational direction. In this example, the H-bridge driver is a STMicroelectronics VNH2SP30-E but any suitable H-bridge driver may be used. As shown in FIGS. 4A to 4C, four switches S1, S2, S3 and S4 are integrated into the H-bridge driver 64 and are arranged as an H-bridge 74 to switch the polarity of the current going to the electromagnetic coil 48. There is a current shunt Rs, in this example, for measuring the current passing through the electromagnetic coil 48, but this is not required. In this example, the PWM to the H-bridge 74 is a signed magnitude of 20 kHz PWM. The function of the H-bridge 74 is to reduce the magnetic remanence/hysteresis effect. This results in a steering effort for a given steering PWM remaining substantially the same before and after a hardstop. In alternative examples the H-bridge 74 may have another means such as an internal current sensing sensor to measure current passing through the electromagnetic coil.

In operation, when a hardstop is reached a hardstop PWM of, for example, is +100% is applied and S2 and S3 are open while S1 and S4 are closed as shown in FIG. 4A. Current flows from a 12V power source through S1 into the electromagnetic coil 48 and then through S4 to ground. When the rotational sensor 66 senses that the steering shaft 28 is being rotated away from the hardstop, as permitted by the rotational play, the microcontroller 62 drives the H-bridge driver 64 to apply a reverse polarity pulse for a fixed duration of time which is determined by the characteristics of the electromagnetic coil 48. In this example, a reverse polarity pulse is applied for approximately 15 to 20 milliseconds at a moment when steering away from the hardstop occurs. During the application of the reverse polarity pulse, S2 and S3 are closed while S1 and S4, are open as shown in FIG. 4B. A reverse polarity pulse of, for example, −100% is applied. Current flows to ground through S2, electromagnetic coil 48, S3 and then back to the 12V power source. This transition from current flowing in one polarity, as shown in FIG. 4A, to current flowing in the reverse polarity, as shown in FIG. 4B, causes the electromagnetic coil 48 current to rapidly decay as it is flowing against the full force of the power voltage supply. As steering continues away from the hardstop there is a steering PWM of, for example +10% to +20%, and S1 and S4 are closed as shown FIG. 4C. The current flows in the same direction as when the stop mechanism 72 of the steering mechanism is fully engaged but the PWM is reduced to provide a steering resistance. A reduced steering effort is accordingly required when steering away from a hardstop.

Figure 5:
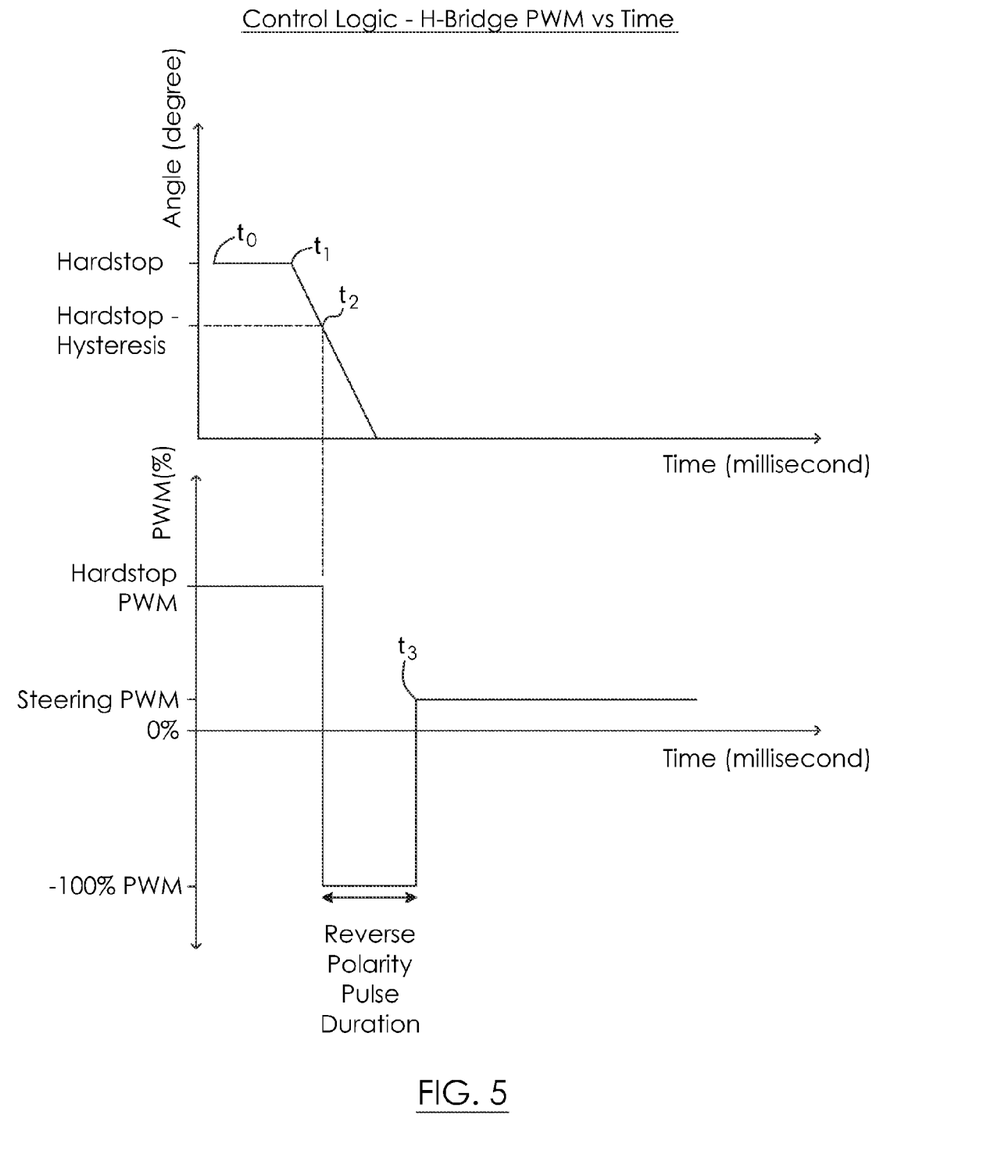
FIG. 5 are graphs illustrating H-Bridge PWM control logic of the steering apparatus of FIG. 1.

FIG. 5 illustrates the H-Bridge PWM control logic when steering away from a hardstop occurs. The top graph is a steering angle versus time plot and the bottom graph is a signed magnitude PWM versus time plot. The steering shaft 28 is at a hardstop at time $t_0$ and a hardstop PWM is applied to electromagnetic coil 48 of the steering apparatus 18, causing the stop mechanism 72 to fully engage the steering shaft. At time $t_1$ the steering shaft 28 starts to rotate away from the hardstop as permitted by the rotational play. At $t_2$ the steering shaft has been steered an angular distance equal to a hysteresis threshold, i.e. the steering position reaches 'Hardstop—Hysteresis'. This triggers the beginning of the reverse polarity pulse logic in the microcontroller 62. The microcontroller 62 drives the H-bridge driver 64 to apply a PWM voltage to the electromagnetic coil that has a reverse polarity compared to the hardstop PWM. This quickly decays the current in the electromagnetic coil 48 and neutralizes the magnetic hysteresis effect in the electromagnetic coil 48. The reverse polarity pulse also reduces the mechanical hysteresis effect in the stop mechanism assembly. The reverse polarity pulse duration in the example is between 15 and 20 ms. The reverse polarity pulse ends at time $t_3$ and the H-bridge driver applies a steering resistance PWM to the electromagnetic coil that has the same polarity as the hardstop PWM. The steering effort at time $t_3$ will accordingly be very similar to the steering effort before the hardstop was engaged at time $t_0$. This is a result of the reverse polarity pulse.

Figure 6:
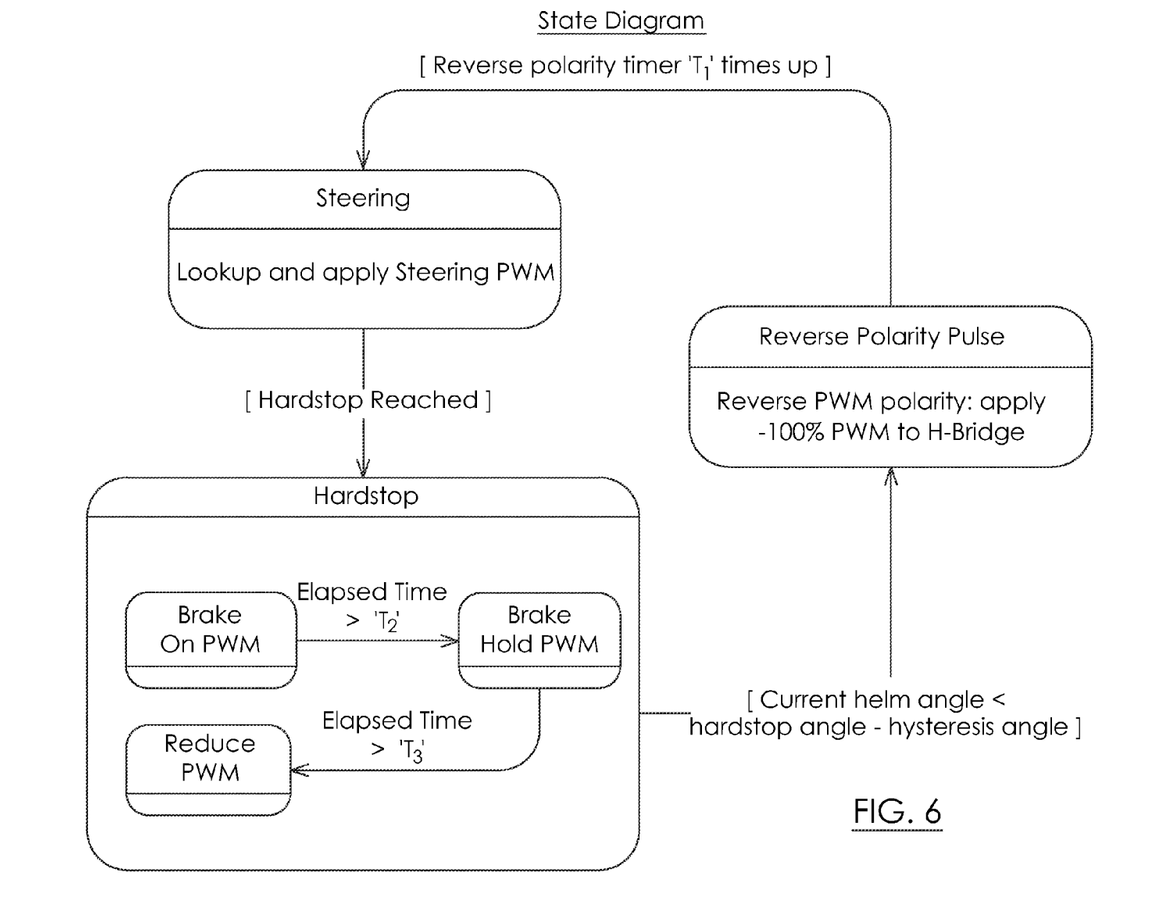
FIG. 6 is a state diagram of the control logic of the steering apparatus of FIG. 1.

FIG. 6 illustrates the state diagram of the steering apparatus control logic. There are three main states, namely, a Steering State, Hardstop State, and Reverse Polarity Pulse State. In the Steering State, the microcontroller controls and varies the steering resistance by monitoring the different inputs of different sensors on the vehicle. For example, this may include inputs from the rotational sensor 66, shown in FIGS. 2 and 3, which functions as a steering position sensor and/or a vehicle speed sensor (not shown) to allow steering resistance to be correlated to vehicle speed, e.g. the higher the marine vessel speed, the higher the steering resistance. The logic enters the Hardstop State when the rotational sensor 66 senses a hardstop has been reached. The Hardstop State can be further defined into three sub-states. There is a Brake on PWM Sub-State which executes when the hardstop is reached and the microcontroller 62 drives the H-bridge driver 64 to apply the hardstop PWM. After a predetermined time $T_2$ has elapsed, one second in this example, the logic enters the Brake Hold PWM Sub-State and the microcontroller 62 drives the H-Bridge driver 64 to apply a lower PWM to the electromagnetic coil 48. The lower PWM is such that it maintains the same braking force but draws lower current. After a predetermined time $T_3$ has elapsed, thirty seconds in this example, the logic enters a Reduce PWM Sub-State, and the PWM is lowered further to further lower current draw and prevent the electromagnetic coil from overheating. At any given time when the Hardstop State is being executed, if the steering shaft 28 has been steered away from a hardstop and reaches a position that is equal or less than hardstop angle—hysteresis angle, the logic transitions to the Reverse Polarity Pulse State. In the Reverse Polarity Pulse State, a reverse polarity pulse is applied for a fixed duration to remove the magnetic and mechanical hysteresis effect resulting from the hardstop PWM generated during the Hardstop State. The logic enters the Steering State again after a preset reverse polarity timer $T_1$ elapsed.

Figure 7:
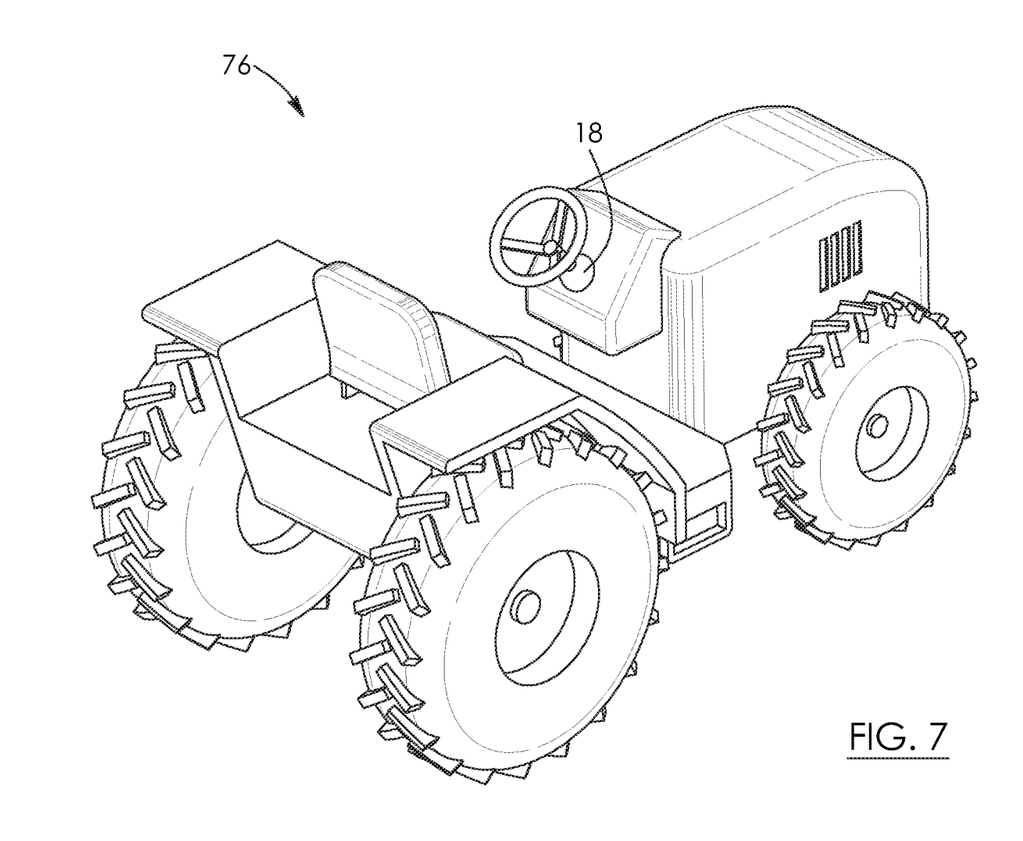
FIG. 7 is a perspective view of a land vehicle provided with the improved steering apparatus.

It will be understood by a person skilled in the art that the steering mechanism discloses herein may be used any steered vehicle, for example, FIG. 7 shows the steering apparatus 18 disclosed herein used to steer a land vehicle in form of a truck 76.

It will also be understood by a person skilled in the art that many of the details provided above are by way of example only, and are not intended to limit the scope of the invention which is to be determined with reference to the following claims.

What is claimed is:

1. A steering apparatus for a steered vehicle, the steering apparatus comprising:
   a rotatable steering shaft;
   a sensor which senses angular movement of the steering shaft as the vehicle is being steered;
   a stop mechanism which releasably engages the steering shaft to prevent rotation of the steering shaft;
   an electromagnetic actuator which actuates the stop mechanism to engage or release the steering shaft;
   a microcontroller which causes the electromagnetic actuator to actuate the stop mechanism to fully engage the steering shaft when the sensor senses that the steering shaft has reached a hardstop position to prevent rotation of the steering shaft in a first rotational direction, which corresponds to movement towards the hardstop position, while allowing rotational play between the steering shaft and the stop mechanism in a second direction, which corresponds to rotational movement away from the hardstop position;
   a driver which applies a reserve polarity pulse to the electromagnetic actuator when the stop mechanism is fully engaged with the steering shaft and the steering shaft is rotated, as permitted by the rotational play, in the second rotational direction.

2. The steering apparatus as claimed in claim 1 wherein the driver applies the reserve polarity pulse to the electromagnetic actuator at a moment when the steering shaft is rotated in the second rotational direction.

3. The steering apparatus as claimed in claim 1 or 2 wherein the microcontroller causes the electromagnetic actuator to actuate the stop mechanism to release the steering shaft when the stop mechanism is fully engaged with the steering shaft and the steering shaft is rotated, as permitted by the play, in the second rotational direction.

4. The steering apparatus as claimed in any one of claims 1 to 3 wherein the microcontroller causes the electromagnetic actuator to actuate the stop mechanism to partially engage the steering shaft to provide steering resistance.

5. The steering apparatus as claimed in any one of claims 1 to 4 wherein the stop mechanism includes a multi-plate clutch, the multi-plate clutch having a plurality of clutch plates which are urged into frictional engagement with each other by the electromagnetic actuator to engage the steering shaft.

6. The steering apparatus as claimed in any one of claims 1 to 5 further including a housing having a hollow interior, wherein there are grooves on an interior wall of the housing and a first type of clutch plates have projections which fit within the grooves on the interior wall of the housing.

7. The steering apparatus as claimed in any one of claims 1 to 6 further including resilient, channel-shaped inserts in the grooves on the interior wall of the housing.

8. The steering apparatus as claimed in any one of claims 1 to 7 further including grooves on the steering shaft wherein a second type of clutch plates have projections which fit within the grooves in the steering shaft, the grooves on the steering shaft of the housing being wider than the projections to allow for the rotational play between the steering shaft and the stop mechanism when the stop mechanism is fully engaged.

9. The steering apparatus as claimed in any one of claims 1 to 8 further including inserts in the grooves in the steering shaft.

10. The steering apparatus as claimed in any one of claims 1 to 9 wherein the electromagnetic actuator includes a electromagnetic coil, a mounting plate and an armature, and wherein the clutch plates are disposed between the electromagnetic coil and the armature.

11. The steering apparatus as claimed in any one of claims 1 to 10 further including a spring which preloads the clutch plates for improved gap control.

12. The steering apparatus as claimed in any one of claims 1 to 11 further including a shim between the electromagnetic coil and the mounting plate to set the electromagnetic coil and the mounting plate at a predetermined clearance.

13. A vehicle provided with the steering apparatus as claimed in any one of claims 1 to 12.

14. The vehicle as claimed in any one of claims 1 to 12 wherein the vehicle is a marine vessel.

15. The vehicle as claimed in claim 1 in any one of claims 1 to 12 wherein the vehicle is a land vehicle.

* * * * *